United States Patent
Hariyani et al.

(10) Patent No.: US 11,858,420 B2
(45) Date of Patent: Jan. 2, 2024

(54) BELOW VEHICLE RENDERING FOR SURROUND VIEW SYSTEMS

(71) Applicant: Texas Instruments Incorporated, Dallas, TX (US)

(72) Inventors: Hemant Vijay Kumar Hariyani, Plano, TX (US); Aishwarya Dubey, Plano, TX (US); Mihir Narendra Mody, Bengaluru (IN)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 17/536,727

(22) Filed: Nov. 29, 2021

(65) Prior Publication Data

US 2023/0166659 A1    Jun. 1, 2023

(51) Int. Cl.
*B60R 1/00* (2022.01)
*G06V 20/56* (2022.01)
(Continued)

(52) U.S. Cl.
CPC .............. *B60R 1/00* (2013.01); *G06T 3/0018* (2013.01); *G06T 3/4038* (2013.01); *G06T 7/70* (2017.01);
(Continued)

(58) Field of Classification Search
CPC ................ B60R 1/00; B60R 2300/105; B60R 2300/303; B60R 2300/304;
(Continued)

(56) References Cited

U.S. PATENT DOCUMENTS 8,378,851 B2 * 2/2013 Stein .................... G06V 10/143
382/104
9,041,898 B1 * 5/2015 Reilly .................. G01C 11/025
348/146
(Continued)

FOREIGN PATENT DOCUMENTS

CN           105763854 A  *  7/2016  ............... B60R 1/00
DE    102018132676 A1  *  6/2020

OTHER PUBLICATIONS

Cao T, Translation of CN-105763854-A Jul. 2016 (Year: 2016).*
Arbeiter G Translation of DE-102018132676-A1 Jun. 2020 (Year: 2020).*

*Primary Examiner* — Zaihan Jiang
(74) *Attorney, Agent, or Firm* — Brian D. Graham; Frank D. Cimino

(57) ABSTRACT

A technique for rendering an under-vehicle view including obtaining a first location of a vehicle, the vehicle having a set of cameras disposed about the vehicle, capturing a set of images; storing images of the set of images in a memory, wherein the images are associated with a time the images were captured, moving the vehicle to a second location, obtaining the second location of the vehicle, determining an amount of time for moving the vehicle from the first location to the second location, generating a set of motion data, the motion data indicating a relationship between the second location of the vehicle and the first location of the vehicle, obtaining one or more stored images from the memory based on the determined amount of time, rendering a view under the vehicle based on the one or more stored images and set of motion data, and outputting the rendered view.

20 Claims, 8 Drawing Sheets

(51) Int. Cl.
*G06V 10/80* (2022.01)
*G06T 7/70* (2017.01)
*G06T 7/80* (2017.01)
*G06T 3/00* (2006.01)
*G06T 3/40* (2006.01)
*G06T 17/20* (2006.01)

(52) U.S. Cl.
CPC ............... *G06T 7/80* (2017.01); *G06T 17/20* (2013.01); *G06V 10/80* (2022.01); *G06V 20/56* (2022.01); *B60R 2300/105* (2013.01); *B60R 2300/303* (2013.01); *B60R 2300/304* (2013.01); *B60R 2300/60* (2013.01); *G06T 2207/20221* (2013.01); *G06T 2207/30252* (2013.01)

(58) Field of Classification Search
CPC ......... B60R 2300/60; G06T 7/80; G06T 7/70; G06T 3/0018; G06T 3/4038; G06T 17/20; G06T 2207/20221; G06T 2207/30252; G06V 10/80; G06V 20/56
See application file for complete search history.

(56) References Cited

U.S. PATENT DOCUMENTS

| | | | | |
|---|---|---|---|---|
| 9,503,860 | B1* | 11/2016 | Mankovskii | H04W 4/023 |
| 11,494,927 | B2* | 11/2022 | Guizilini | G06T 7/55 |
| 2014/0334675 | A1* | 11/2014 | Chu | G06T 7/73 382/103 |
| 2017/0341583 | A1* | 11/2017 | Zhang | B60R 1/00 |
| 2019/0271559 | A1* | 9/2019 | Colgate | G01C 21/3841 |
| 2020/0293796 | A1* | 9/2020 | Sajjadi Mohammadabadi | G06V 10/751 |
| 2020/0396367 | A1* | 12/2020 | Segapelli | H04N 23/73 |
| 2020/0402249 | A1* | 12/2020 | Kim | G06T 7/579 |
| 2021/0372808 | A1* | 12/2021 | Taieb | G06V 20/584 |
| 2022/0084229 | A1* | 3/2022 | Guizilini | G06T 7/30 |

* cited by examiner

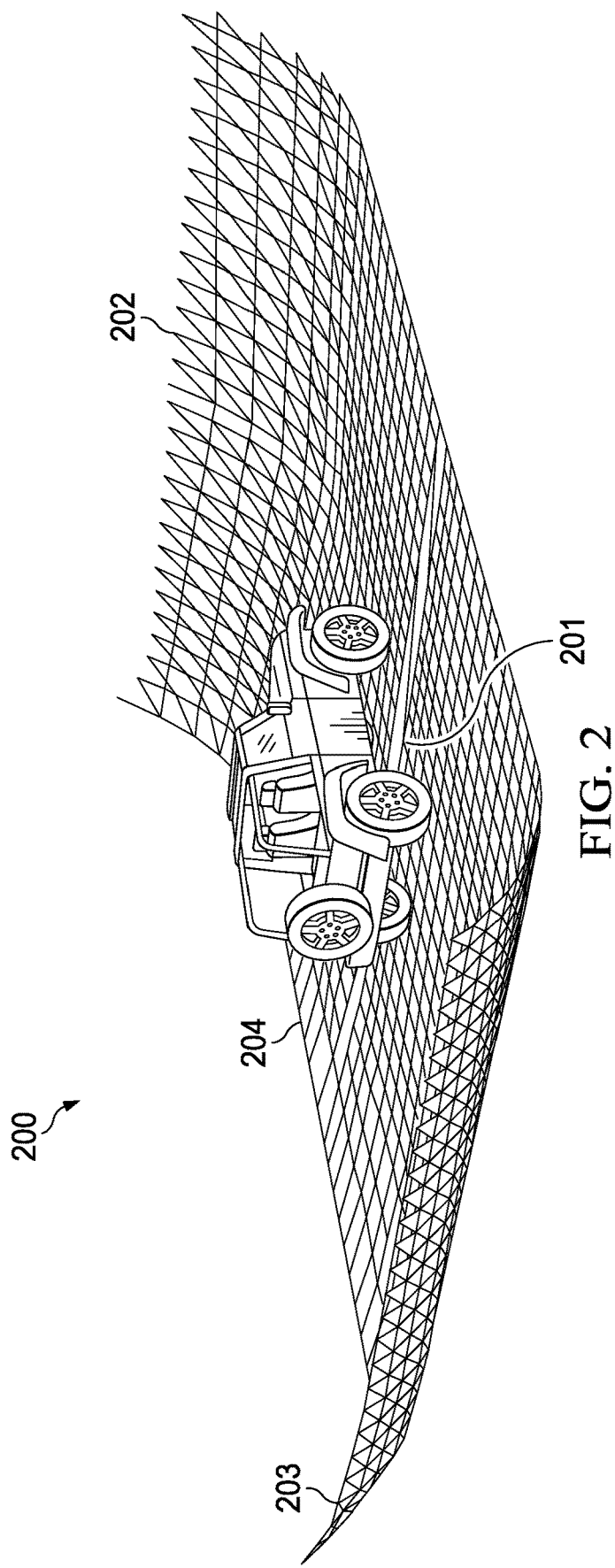

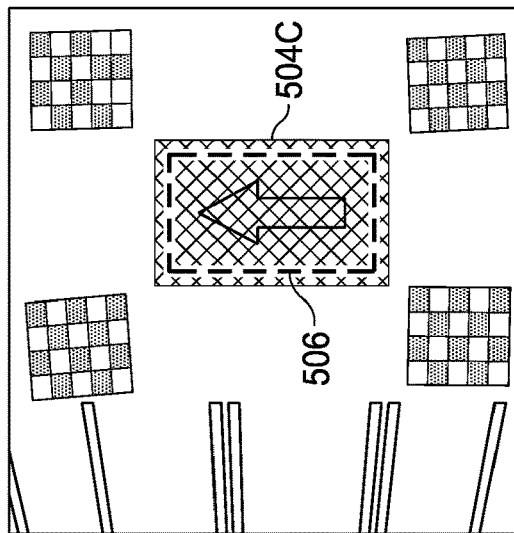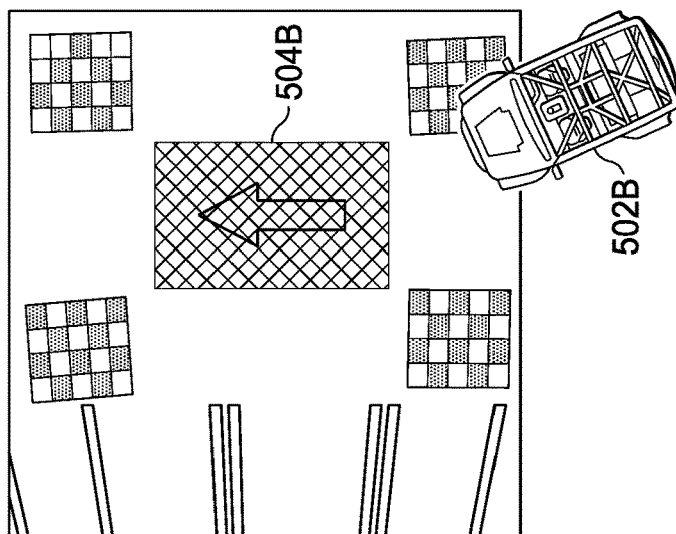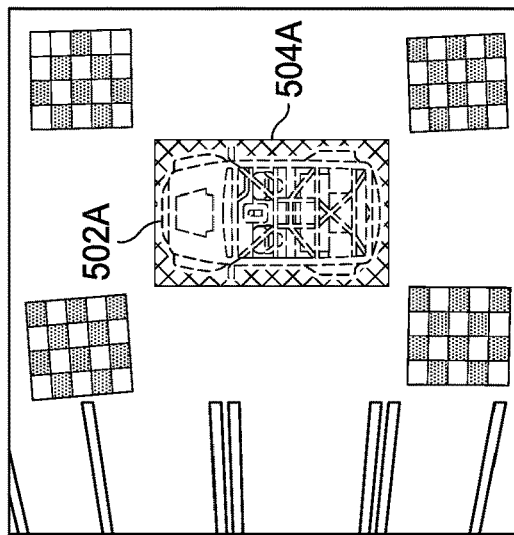

BELOW VEHICLE RENDERING FOR SURROUND VIEW SYSTEMS

BACKGROUND

Increasingly, vehicles, such as cars, airplanes, robots, etc., are being equipped with multiple external cameras to provide to the operator of the vehicle external views of the area surrounding the vehicle. These external views are commonly used to help maneuver the vehicle, such as when backing up or parking a car. Multiple camera views may be stitched together to form an external surround view around the vehicle. However, external views of areas which are not within a field of view of any cameras of such systems may not be available. Additionally, generating these multi-camera views requires multiple cameras, failure of one or more cameras can hinder operations of such systems. Therefore, it is desirable to have an improved technique for sensor fusion based perceptually enhanced surround view.

SUMMARY

This disclosure relates to a technique for rendering an under-vehicle view, including obtaining a first location of a vehicle, the vehicle having a set of cameras disposed about the vehicle. The technique also includes capturing, by the set of cameras, a set of images. The technique further includes storing images of the set of images in a memory, wherein the images are associated with a time the images were captured. The technique also includes moving the vehicle to a second location. The technique further includes obtaining the second location of the vehicle. The technique also includes determining an amount of time for moving the vehicle from the first location to the second location. The technique further includes generating a set of motion data, the motion data indicating a relationship between the second location of the vehicle and the first location of the vehicle. The technique also includes obtaining one or more stored images from the memory based on the determined amount of time. The technique further includes rendering a view under the vehicle based on the one or more stored images and set of motion data and outputting the rendered view.

Another aspect of the present disclosure relates to an electronic device, comprising a memory. and one or more processors. The one or more processors are configured to execute instructions causing the one or more processors to obtain a first location of a vehicle, the vehicle having a set of cameras disposed about the vehicle. The instructions also cause the one or more processors to obtain, from the set of cameras, a set of images. The instructions further cause the one or more processors to store images of the set of images in the memory, wherein the images are associated with a time the images were captured. The instructions also cause the one or more processors to obtain a second location of the vehicle, wherein the vehicle has moved to the second location. The instructions further cause the one or more processors to determine an amount of time used to move the vehicle from the first location to the second location. The instructions also cause the one or more processors to generate a set of motion data, the motion data indicating a relationship between the second location of the vehicle and the first location of the vehicle. The instructions further cause the one or more processors to obtain one or more stored images from the memory based on the determined amount of time. The instructions also cause the one or more processors to render a view under the vehicle based on the one or more stored images and set of motion data and output the rendered view.

Another aspect of the present disclosure relates to a non-transitory program storage device comprising instructions stored thereon. The instructions cause one or more processors to obtain a first location of a vehicle, the vehicle having a set of cameras disposed about the vehicle. The instructions further cause the one or more processors to obtain, from the set of cameras, a set of images. The instructions also cause the one or more processors to store images of the set of images in a memory, wherein the images are associated with a time the images were captured. The instructions further cause the one or more processors to obtain a second location of the vehicle, wherein the vehicle has moved to the second location. The instructions also cause the one or more processors to determine an amount of time used to move the vehicle from the first location to the second location. The instructions further cause the one or more processors to generate a set of motion data, the motion data indicating a relationship between the second location of the vehicle and the first location of the vehicle. The instructions also cause the one or more processors to obtain one or more stored images from the memory based on the determined amount of time. The instructions further cause the one or more processors to render a view under the vehicle based on the one or more stored images and set of motion data and output the rendered view.

BRIEF DESCRIPTION OF THE DRAWINGS

For a detailed description of various examples, reference will now be made to the accompanying drawings in which:

FIG. 2 is an illustration of an example three-dimensional (3D) bowl mesh for use in a surround view system, in accordance with aspects of the present disclosure.

FIGS. 5A-5C illustrate an example technique for generating an under-vehicle view, in accordance with aspects of the present disclosure.

DETAILED DESCRIPTION

Figure 1A:
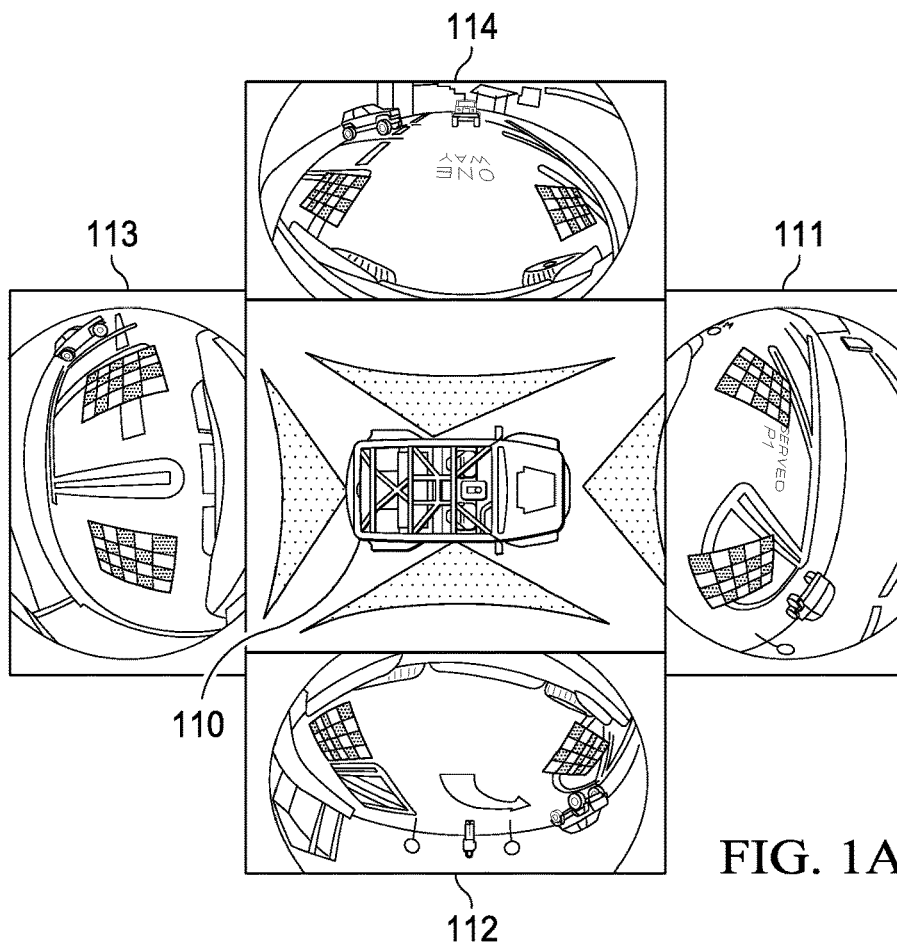
FIGS. 1A and 1B are diagrams illustrating a technique for producing a 3D surround view, in accordance with aspects of the present disclosure.

FIG. 1A is a diagram illustrating a technique for producing a 3D surround view, in accordance with aspects of the present disclosure. The process for producing a 3D surround view produces a composite image from a viewpoint that appears to be located directly above as vehicle looking straight down. In essence, a virtual top view of the neighborhood around the vehicle is provided.

Some example vehicle surround view systems include between four and six fish-eye cameras mounted around a vehicle 110. For example, a camera set includes one camera at the front of the vehicle 110, another at the rear of the vehicle 110, and one on each side of the vehicle 110. Images produced by each camera may be provided to an image signal processing system (ISP) that includes memory circuits for storing one or more frames of image data from each camera. Fish-eye images 111-114 captured by each camera may be conceptually arranged around the vehicle 110, for example.

An example process of producing a surround view from multiple fish eye lens cameras is described in: "Surround view camera system for ADAS on TI's TDAx SoCs," Vikram Appia et al, October 2015 (available at https://www.ti.com/lit/pdf/spry270), which is incorporated by reference herein. A basic surround view camera solution typically includes two key algorithm components: geometric alignment and composite view synthesis. Geometric alignment corrects lens (e.g., fish-eye) distortion for input video frames and converts them to a common birds-eye perspective. The synthesis algorithm generates the composite surround view after geometric correction. To produce a seamlessly stitched surround view output, another key algorithm referred to as "photometric alignment" may be utilized. Photometric alignment corrects the brightness and color mismatch between adjacent views to achieve seamless stitching. Photometric correction is described in detail, for example, in U.S. patent application Ser. No. 14/642,510, entitled "Method, Apparatus and System for Processing a Display From a Surround View Camera Solution," filed Mar. 9, 2015, which is incorporated by reference herein.

Camera system calibration may include both lens distortion correction (LDC) and perspective transformation. For fish-eye lens distortion correction, a radial distortion model may be used to remove fish-eye from original input frames by applying the inverse transformation of the radial distortion function. After LDC, four extrinsic calibration matrices may be estimated, one for each camera, to transform four input LDC-corrected frames so that all input views are properly registered in a single world co-ordinate system. A chart-based calibration approach may be used. The content of the chart is designed to facilitate the algorithm accurately and reliably finding and matching features. Chart based calibration is discussed in detail, for example, in U.S. patent application Ser. No. 15/294,369 entitled "Automatic Feature Point Detection for Calibration of Multi-Camera Systems," filed Oct. 14, 2016, which is incorporated by reference herein.

Figure 1B:
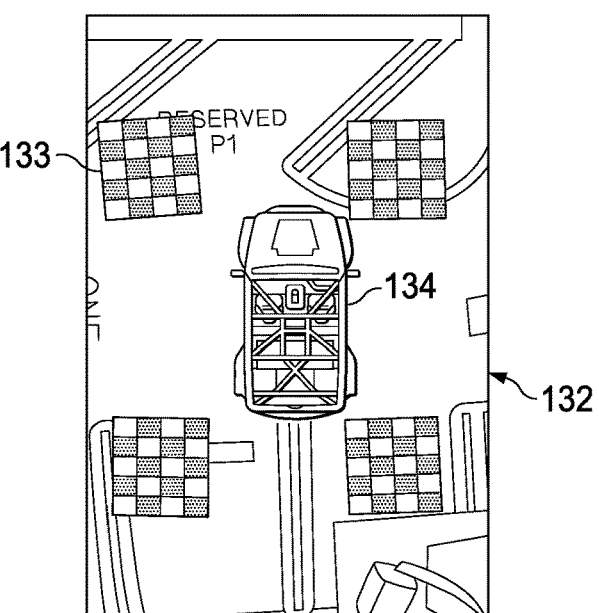

Assuming proper geometric alignment is already applied to the input frames, a composite surround view 132 of FIG. 1B may be produced using, for example, a digital signal processor (DSP). The composite surround view uses data from input frames from the set of cameras. The overlapping regions are portions of the frames that come from the same physical world but are captured by two adjacent cameras, i.e., O{m,n}, where m=1, 2, 3, 4, and n=(m+1) mod 4. O{m,n} refers to the overlapping region between view m and view n, and n is the neighboring view of view m in clockwise order. At each location in O{m,n}, there are two pixels available, i.e., the image data from view m and its spatial counterpart from view n. The overlapping regions may be blended based on weights assigned to the overlapping pixels and/or portions of the overlapping regions.

The calibrated camera system produces a surround view synthesis function which receives input video streams from the four fish-eye cameras and creates a composite 3D surround view 132. A LDC module may perform fish-eye correction, perspective warp, alignment, and bilinear/bicubic interpolation on the image frames from each of the four fish-eye cameras. The LDC module may be a hardware accelerator (HWA) module, for example, and may be incorporate as a part of a DSP module or graphics processing unit (GPU). The DSP and/or GPU module may also perform stitching and may overlay an image of a vehicle, such as vehicle image 134, on the final composite surround view 132 output image.

This synthesis creates the stitched output image using the mapping encoded in the geometric LUT. In overlapping regions of the output frame, where image data from two adjacent input frames are required, each output pixel maps to pixel locations in two input images. In the overlapping regions, the image data from the two adjacent images may be blended or a binary decision may be performed to use data from one of the two images.

Regions where no image data is available can result in holes in the stitched output image. For example, the region underneath the vehicle is generally not directly imaged and may appear as a blank or black region in the stitched output image. Typically, this blank region is filled by the overlaid image of the vehicle, such as vehicle image 134.

FIG. 2 is an illustration of an example three-dimensional (3D) bowl mesh 200 for use in a surround view system, in accordance with aspects of the present disclosure. For a 3D image, the world around the vehicle may be represented in the shape of a bowl. Due to lack of complete depth of the scene, the bowl is a reasonable assumption for the shape of the world around the vehicle. This bowl can be any smooth varying surface. In this particular representation, a bowl 200 is used that is flat 201 in the regions near the vehicle and curved away from the vehicle, as indicated at 202, 203 for the front and back, respectively. In this example, the bowl may curve up only slightly on each side, as indicated at 204. Other bowl shapes may be used on other embodiments.

Images, such as the stitched output image, may be overlaid, for example, by a graphics processing unit (GPU) or image processor, onto the 3D bowl mesh 200 and a set of virtual viewpoints, or virtual cameras, may be defined, along with mappings from the cameras used to create the stitched output image and the virtual viewpoints.

Figure 3:
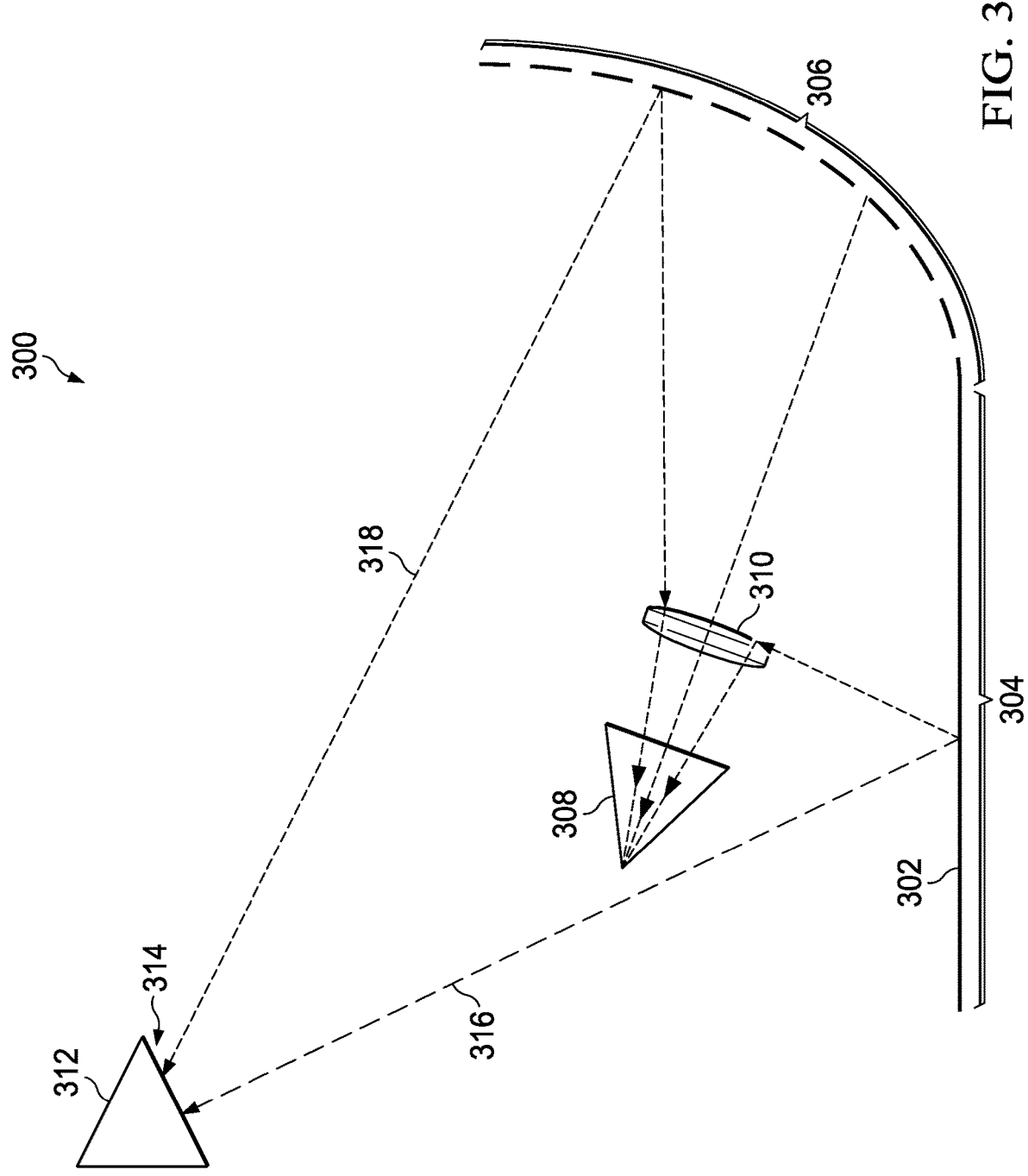
FIG. 3 illustrates a ray tracing process for mapping virtual cameras to physical cameras, in accordance with aspects of the present disclosure.

FIG. 3 illustrates a ray tracing process 300 for mapping virtual cameras to physical cameras, in accordance with aspects of the present disclosure. This example represents a cross sectional view of a portion 302 of a bowl mesh similar to bowl mesh 200 of FIG. 2. Bowl mesh 302 may include a flat portion 304 and a raised portion 306, similar to flat portion 201 and raised portion 202, of FIG. 2. A camera 308 with a fish-eye lens 310 may be mounted on the front of an actual vehicle, as described in more detail above. A virtual viewpoint 312 for an output image may be defined to be, for example, above the actual vehicle location.

An initial calibration of the cameras may be used to provide a mapping of locations in the imaged region, as projected onto the bowl mesh 302 to pixels of the camera 308 with a fish-eye lens 310. This mapping may be prepared, for example, during a calibration phase, and stored, for example, in a look-up table. As discussed above, a virtual viewpoint 312 may be defined at a location separate from the hardware camera 308. A mapping for the virtual viewpoint 312 may be defined by casting a ray from the virtual viewpoint 312 location in the virtual viewpoint image plane 314 and identifying the location that the ray intersects the bowl mesh 302. Rays 316, 318 are examples. Ray 316 intersects flat portion 302 of the bowl mesh 302 and ray 318 intersects the raised portion 306 of the bowl mesh 302, for example. The ray casting operation produces a mapping of every 2D point on the virtual viewpoint image plane 314 with corresponding coordinates of the bowl mesh 302. A mapping between the region visible to the virtual viewpoint 312 and the region visible by camera 308 may then be generated using the mapping between the camera 308 and the bowl mesh 302, along with the mapping between the virtual viewpoint 312 and the bowl mesh 302.

In accordance with aspects of the present discussion, the region visible to the virtual viewpoint 312 may include regions which are not visible by camera 308. In such cases, the mappings for the virtual viewpoint may be based on mappings between multiple cameras and the bowl mesh 302. It may be noted that as the virtual viewpoints can be placed arbitrarily and are not limited to a standard directly above view of the vehicle and surrounding areas. For example, the virtual viewpoint could be defined to be above and slightly behind the vehicle in order to provide a more 3D feel to the view. In addition, in certain cases, the viewpoint may be dynamically moved, for example, by a user. In such cases, mappings may be either recalculated dynamically, or based on a set of recalculated mappings for multiple defined locations. In certain cases, regions that are currently not visible to any camera on the vehicle may have been previously imaged by one or more cameras on the vehicle. A temporal camera is a virtual camera capable of providing images of the region based on images captured by the physical cameras. The temporal camera may display images of the region even though the physical cameras on the vehicle cannot directly image the region. These images of the region may be captured at a previous point in time and may be used to provide images of the region, providing a time dimension to the virtual camera viewpoints.

Figure 4:
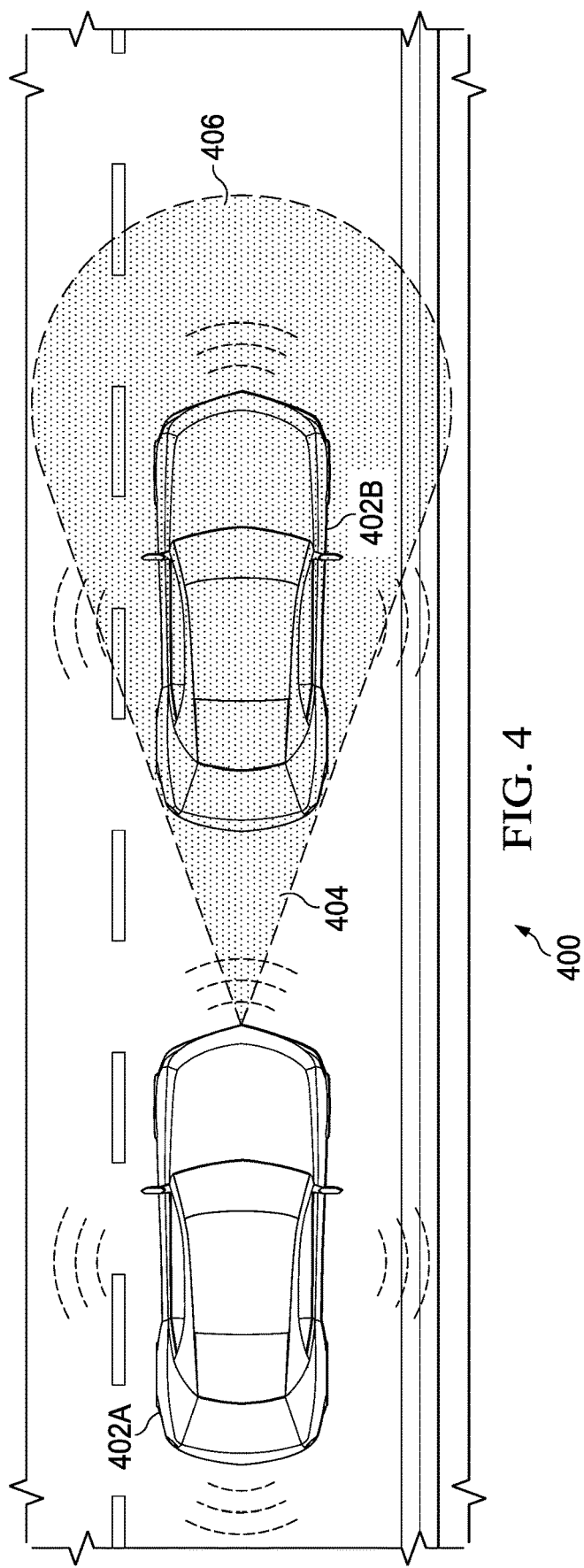
FIG. 4 illustrates an example effect of temporal mapping, in accordance with aspects of the present disclosure.

FIG. 4 illustrates an example 400 effect of temporal mapping, in accordance with aspects of the present disclosure. This example 400 illustrates rendering a view underneath a vehicle. As shown in this example, for a moving vehicle, a region that is not visible by a camera on the vehicle at a current point in time, such as $t_1$, may have been visible to the camera on the vehicle at a previous point in time, such as $t_0$. In FIG. 4, a vehicle 402A at time $t_0$ having a camera pointed in the direction of travel, here forward, is able to image a region 404 ahead of the vehicle 402A, including reference region 406. At time $t_1$, the vehicle 402B has traveled forward enough such that the vehicle 402B is now above the previously imaged region 404 and reference region 406. It should be noted that for clarity the examples provided involve a vehicle with a forward-facing camera and moving forward. However, other cameras may be used corresponding to the direction of travel, such as a rear-facing camera for reversing, or multiple cameras placed about the vehicle may be used, for example when turning.

FIGS. 5A-5C illustrate an example technique for generating an under-vehicle view, in accordance with aspects of the present disclosure. As shown in FIG. 5A, a region currently underneath a vehicle 502A may be associated with an under-vehicle mesh 504A. The under-vehicle mesh 504A may represent the region underneath the vehicle 502A and is where the vehicle 502A is located at a current time. A first location (e.g., current location at $t_n$) of the vehicle 502A and corresponding location of the under-vehicle mesh 504A may be determined. In some cases, location information for the vehicle may be determined by any known technique, such as by using Global Positioning System (GPS) coordinates, augmented GPS, etc. In some cases, the location information may be obtained using a combination of GPS and an Inertial Measurement Unit (IMU). For example, GPS location information may be provided by an augmented GPS and combined with rotation/translation information provided by an accelerometer, inertia sensor, or other such sensor. In some cases, the location information may be determined by one or more systems separate from the surround view system and the location information may be sent to and received (e.g., obtained) by the surround view system.

In some cases, the under-vehicle mesh 504A may be located relative to the 3D bowl mesh. The under-vehicle mesh 504A may be one or more identified portions of the 3D bowl mesh 200, or the under-vehicle mesh 504A may be logically separate from the 3D bowl mesh 200. In some cases, the 3D bowl mesh 200 may be defined relative to the under-vehicle mesh 504A and/or region underneath the vehicle 502A.

The location information may be stored along with a set of images captured by one or more cameras disposed about the vehicle. For example, the vehicle may include cameras sufficient to provide a view around the vehicle. The captured images may be used to provide current views around the vehicle.

Additionally, the captured images for may be stored in a temporal buffer for a period of time. The images may be stored as a set of images including images from the one or more cameras disposed about the vehicle. The cameras may be configured to capture images a certain rate, and a rate at which the captured images are stored may not match the rate at which the images are captured. For example, the camera may be configured to capture images at 60 frames per second, while one frame per second may be stored. A time that the images were captured may be associated with the set of images. For example, sets of images may be captured at times $t_0, t_1, \ldots t_n$. In some cases, the cameras may be configured to capture images when the vehicle is moving.

In some cases, the location information associated with the set of images may be stored in the temporal buffer. The temporal buffer may be a memory, such as double data rate (DDR) memory. In some cases, the memory may be one or more portions of a larger shared memory, such as a general purpose memory, or the memory may be dedicated for use as the temporal buffer. In some cases, a single temporal buffer may be used to store images from multiple cameras. In other cases, multiple temporal buffers may be provided, such as an on-camera, or per-camera, temporal buffer. The period of time may be predefined, for example, when the system is designed, manufactured, configured for use, etc. In some cases, the period of time of time may be defined based on a measure of time. In other cases, the period of time may be defined based on a number of images that may be stored, either per camera, or for the set of cameras. In some cases, images may be stored in the temporal buffer when the vehicle is powered on or moves, regardless of whether the surround view system is generating a view for display. Storing the captured image for use in generating the under-vehicle image can help reduce memory bandwidth use, for example, as compared to rendering an entire 3D scene on the 3D bowl mesh based on the captured images, storing the rendered 3D scene, reloading the stored 3D scene, and rendering an under-vehicle image using the stored 3D scene. Using captured images helps reduce a number of rendering steps and helps allow the captured images to be used to render the under-vehicle using a single GPU processing pass.

Referring to FIG. 5B, which represents a point in time prior to FIG. 5A, the vehicle 502B is shown at an initial location at a time $t_0$ before the vehicle arrives at the location illustrated in FIG. 5A. This initial location may also be determined and corresponding location information may be received by the surround view system. In some cases, location information for the vehicle may be determined by any known technique, such as by using Global Positioning System (GPS) coordinates, augmented GPS, etc. A temporal under-vehicle mesh 504B may be determined. The temporal under-vehicle mesh 504B may represent a future location of the vehicle 502B at a later point in time (e.g., at time $t_n$), as shown in FIG. 5B. The temporal under-vehicle mesh 504B may be determined for previous points in time (e.g., determining, at time $t_n$, the under-vehicle mesh relative to images captured at time $t_0$) corresponding to times at which the sets of images in the temporal buffer were captured. One or more of the sets of images in the temporal buffer may be selected based on, for example, an amount of time that has passed since the images were captured and a distance between the temporal under-vehicle mesh 504B and the current location of the vehicle 502B. For example, assuming the vehicle is moving at a constant rate, the images are captured at a rate of 30 frames per second, and 100 ms has passed, then the frame captures three frames ago may be selected.

Motion data may be determined based on the current location of the vehicle and the temporal under-vehicle mesh 504B (e.g., at time $t_n$) associated with a selected set of images. This motion data may include a translation vector and rotation matrix describing the motion (e.g., change in pose) of the vehicle 502B between the current location at time $t_n$ and the previous location at, for example, time $t_0$.

As shown in FIG. 5C, based on the motion data, temporal under-vehicle mesh 504C, and the selected set of images, an under-vehicle image 506 may be generated for the current location of the vehicle (vehicle not shown in FIG. 5C). The under-vehicle image 506 may be generated by a graphical processing unit (GPU) of the surround view system.

Figure 6:
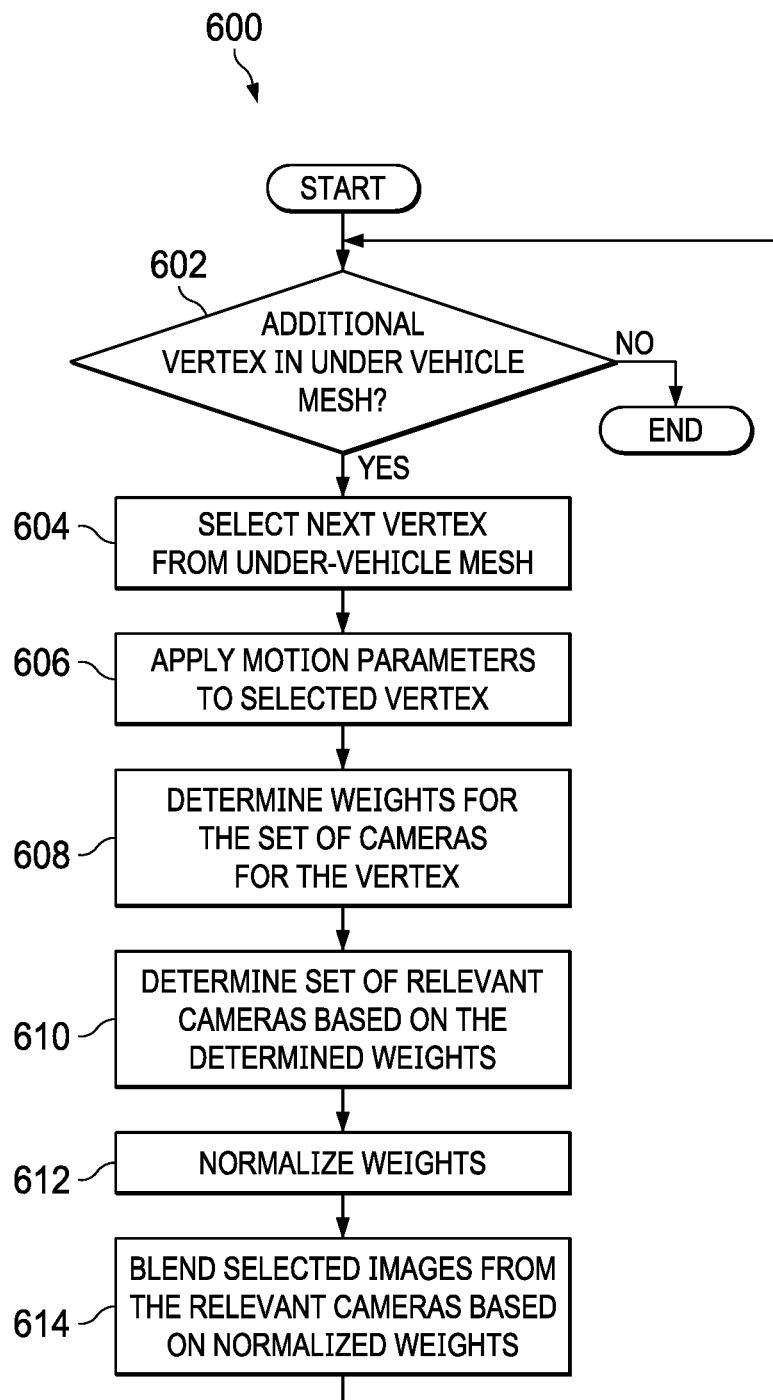
FIG. 6 is a flow diagram illustrating a technique for generating an under-vehicle image, in accordance with aspects of the present disclosure.

FIG. 6 is a flow diagram 600 illustrating a technique for generating an under-vehicle image, in accordance with aspects of the present disclosure. The technique may be performed, at least in part, by the GPU of the surround view system. The technique represents a region underneath a vehicle as an under-vehicle mesh made up of a tessellation of geometric shapes (e.g., triangles) that have corners that meet at vertices of the under-vehicle mesh. Steps 602-614 may be performed for each vertex of the under-vehicle mesh. Accordingly, if, at step 602, there are vertices in the temporal under-vehicle mesh that have not been processed, then execution may proceed. At step 604, a vertex from the temporal under-vehicle mesh is selected. At step 606, the motion parameters are applied to the selected vertex. For example, the motion parameters may include a translation vector and rotation matrix describing the motion (e.g., change in pose) of the vehicle. Applying the motion parameters to the vertex can thus indicate the direction the vehicle has traveled since selected set of images were traveled. This direction information may be used to determine which cameras disposed around the vehicle may have captured images of the region that is now (e.g., at time $t_n$) under the vehicle.

At step 608, weights are determined for the set of cameras for the vertex based on the motion parameters. Each weight may indicate whether and/or how well a respective camera, of the set of cameras, captured an image of the region that is now under the vehicle. For example, the cameras disposed about the vehicle may be associated with an angle of the camera relative to the vehicle. This angle may be predetermined, for example, during development and/or production of the vehicle. The translation vector of the motion parameters indicates an angle at which the temporal under-vehicle mesh is relative to the vehicle, and a vertex specific vector may be determined based on the translation vector and a location of the vertex in the temporal under-vehicle mesh. The weight for a camera may then be determined based on a comparison of the angle of a camera, of the set of cameras, and the vertex specific vector. In some cases, the vertex specific vector may be converted to an angle trigonometrically. Weights may be determined for each camera of the set of cameras for the vertex.

At step 610, a set of relevant cameras may be determined based on the determined weights for the cameras, of the set of cameras. For example, the weights determined for the cameras, of the set of cameras, may be compared to a threshold weight. Cameras associated with weights that do not meet the threshold weight may be determined as not relevant for use in generating the under-vehicle image. In some cases, one or two cameras, of the set of cameras, may meet the threshold weights. At step 612, the weights for the cameras may be normalized. For example, the weights of cameras which do not meet the threshold weight may be set to 0 weight and the cameras which do meet the threshold weight may be adjusted so that the sum total weight of all cameras is equal to 1.

At step 614, selected images from the relevant cameras may be blended based on the normalized weights at the location of the vertex (e.g., as an overlapping region, as described above). In that regard, sets of images over time are stored in memory, and the technique may seek backward (e.g., from time $t_n$ to time $t_0$) by an amount determined based on the motion parameters to determine selected images from a previous time that captured the corresponding region. For example, the selected images, (e.g., captured at time $t_0$), at the location corresponding with the location of the vertex may be blended to generate a texture (e.g., a portion of an image) for the vertex. In cases where a single camera is determined to be the relevant camera, the selected image from the relevant camera may be used, without blending, for the texture. In some cases, blending the selected images to generate the under-vehicle image may be performed in a manner similar to that used to generate the view around the vehicle. In some cases, an existing synthesis block, such as that described in conjunction with FIG. 1 may be used to blend and generate the under-vehicle image. Execution then repeats back to step 602 until all of the vertices are textured. The textures for the vertices may be overlaid on the 3D bowl mesh at the current position of the vehicle and rendered as the under-vehicle image. In some cases, the rendered image may be stored in a display buffer for output. The rendered under-vehicle image may be output for display.

Figure 7:
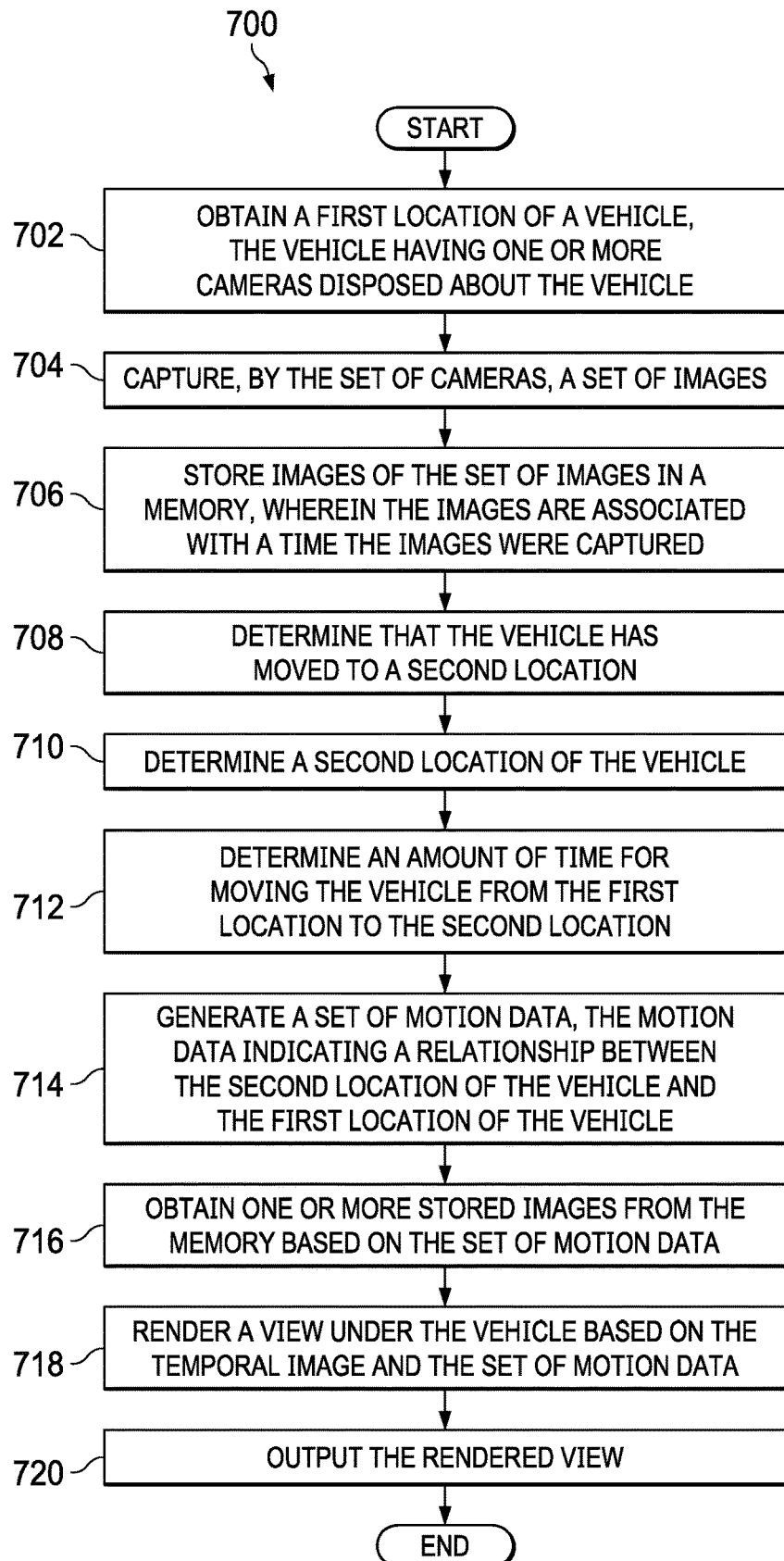
FIG. 7 is a flow diagram illustrating a technique for generating an under-vehicle image, in accordance with aspects of the present disclosure.

FIG. 7 is a flow diagram 700 illustrating a technique for generating an under-vehicle image, in accordance with aspects of the present disclosure. At block 702, a first location of a vehicle may be obtained, the vehicle having a set of cameras disposed about the vehicle. For example, location information may be determined by one or more locating techniques, such as GPS coordinates, IMU, or other location sensors, and this information may be received by a surround view system which supports generating an under-vehicle image. The surround view system also receives images from cameras that are arranged about the vehicle. The cameras may be arranged such that the cameras are able to view an area around the vehicle. For example, a vehicle may have a front facing, rear facing, right facing, and left facing cameras. In some cases, the first location information may be used to generate a temporal under-vehicle mesh representing the location of the vehicle at a first time. At block 704, the set of cameras may capture a set of images. For example, the cameras may capture images and these images may be transmitted to the surround view system. The set of images may be captured at or near the time that the first location of the vehicle is obtained. At block 706, the images of the set of images are stored in a memory, wherein the images are associated with a time the images were captured. For example, images captured by cameras of the set of cameras may be stored in a temporal buffer. The temporal buffer may be a portion of a larger memory, such as a general purpose memory, or the temporal buffer may have a dedicated physical memory. The images may be associated with a time that the images were captured, along with the location of the vehicle at the time the images were captured. For example, the images may be associated with the temporal under-vehicle mesh. At block 708, a determination is made that the vehicle has moved to a second location. At block 710, a second location of the vehicle is obtained. In some cases, the second location may be relative to the first location. In some cases, the second location may be determined in a manner similar to determining the first location.

At block 712, an amount of time used for moving the vehicle from the first location to the second location is determined. At block 714, a set of motion data is generated. The motion data indicates a relationship between the second location of the vehicle and the first location of the vehicle. For example, the motion data may be determined based on the second location of the vehicle and the location of the temporal under-vehicle mesh. The motion data may include a translation vector and rotation matrix describing the change in location between the first location and second location. The translation vector may indicate a direction the vehicle has moved in, and the rotation matrix may indicate whether the vehicle has been rotated. At block 716, one or more stored images are obtained from the memory based on the motion data. For example, the motion data may be used to determine a set of images stored in the temporal buffer at a time when the region associated with the under-vehicle mesh was not obscured by the vehicle, and the set of images associated with the determined time may be retrieved. At block 718, a view under the vehicle is rendered based on the stored images and set of motion data. For example, the motion parameters may be applied to the vertices of the temporal under-vehicle mesh, weights may be applied to the one or more cameras of the vehicle. The weights may be based on the motion parameters and an angle associated with each camera of the one or more cameras. Relevant cameras may be determined based on the weights, and stored images previously captured by the relevant cameras may be blended to render the under-vehicle image. At block 720, the rendered view is output.

Figure 8:
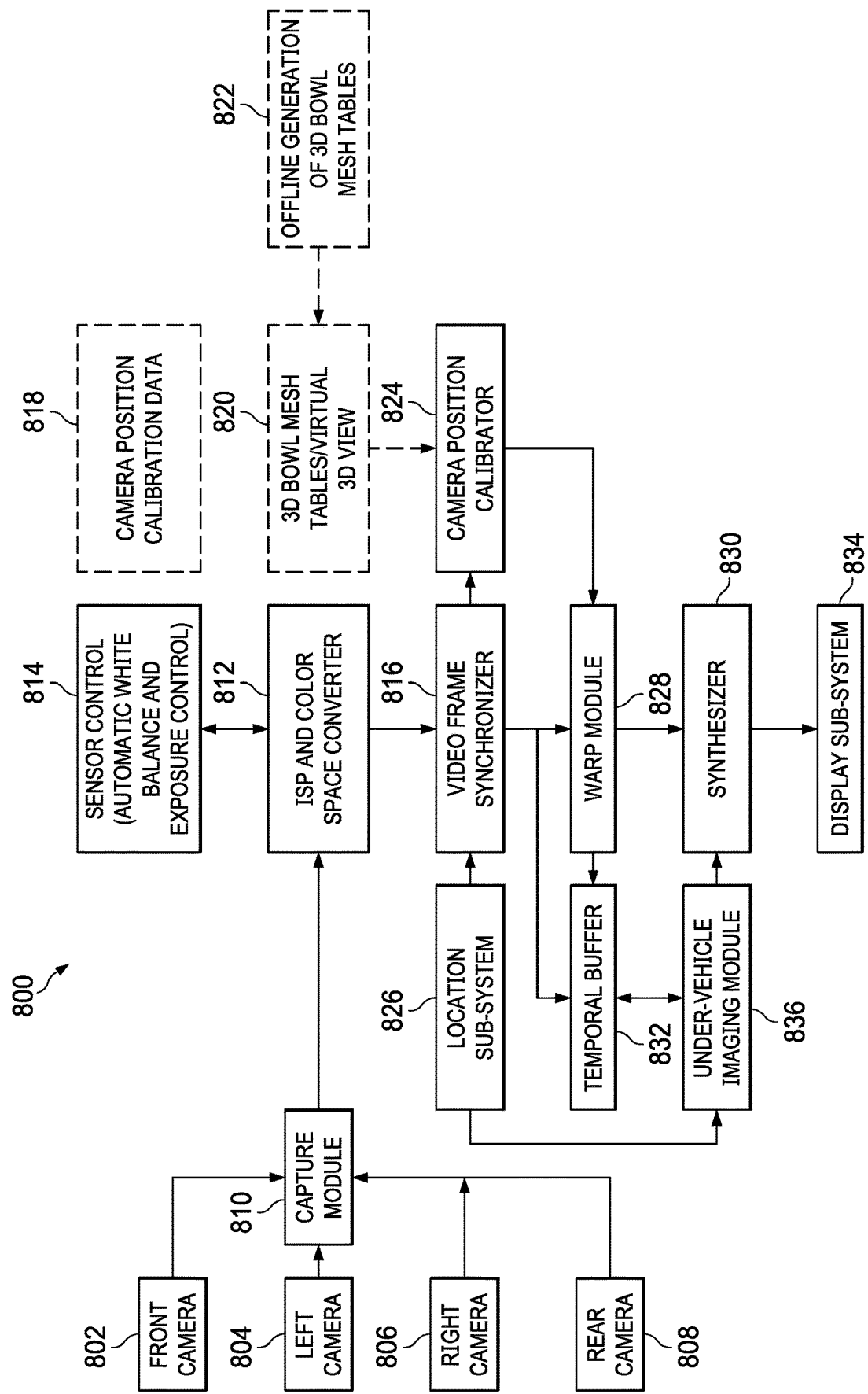
FIG. 8 is a block diagram of an embodiment of a system, in accordance with aspects of the present disclosure.

FIG. 8 is a block diagram of an embodiment of a system 800, in accordance with aspects of the present disclosure. This example system 800 includes multiple cameras, such as cameras 800-808 that are placed around the periphery of the vehicle and coupled to a capture block 810. Block 812 may perform color corrections operations (such as conversion from Bayer format to YUV420 format, color tone mapping, noise filter, gamma correction, etc.) if required, using known or later developed image processing methods. Block 814 may perform automatic exposure control of the video sensors and white balance to achieve optimal image quality using known or later developed techniques. Block 816 synchronizes all the cameras 800-808 to ensure that each frame captured from the sensor is in same time period.

In certain cases, location information, provided by location sub-system 826, may be associated with the images (e.g., synchronized frames) captured by the cameras. The location sub-system may comprise, for example a GPS sensor along with other sensors, such as inertial or acceleration sensors. Captured images may be stored in the temporal buffer 832 along with location information. In this example, the captured images may be processed by a warp module 828 prior to storage in the temporal buffer 832. In some cases, captured images may be stored in the temporal buffer 832 prior to processing by the warp module 828.

A mapping lookup table produced by calibrator 824 can be used by the warp module 828 to warp input video frames provided directly by the cameras 802-808. Thus, fisheye distortion correction and viewpoint warping may both be performed in a single operation using the predetermined viewpoint mappings. One or more images process by the warp module 828 may be stored in the temporal buffer 832.

An under-vehicle imaging module 836 may determine the stored images to retrieve from the temporal buffer 832. The under-vehicle imaging module 836 may also be receive location information from the location sub-system 826. The under-vehicle imaging module 836 may generate motion data based on the location information and determine weights for blending the images retrieved from the temporal buffer 832. The under-vehicle imaging module 836 may pass the determined weights and retrieved images to a synthesizer module 830 to generate the under-vehicle image.

Synthesizer module 830 is responsible for generation of a composite video frame that includes one frame from each video channel. Depending on the virtual viewpoint the composition parameters can change. This module is similar to the synthesis block described above with regard to FIG. 1. In place of the fish-eye input images, synthesizer module 830 receives the warp modified output for each camera image from the warp module 828.

The synthesizer module 830 may stitch and blend images corresponding to adjacent cameras and stored/retrieved images based on weights associated with the cameras and images. The blending location will vary based on the location of the virtual view and this information may also be encoded in the offline generated world to view meshes. In some cases, the synthesizer module 830 may access a GPU to help perform the stich and blend operations.

A display sub-system 834 may receive the video stream output from synthesizer module 830 and display the same on a connected display unit for viewing by a driver of the vehicle, such as an LCD, Monitor, TV, etc. The system may be configured to also display meta data such detected object, pedestrians, warnings, etc.

In the particular implementation described herein, four cameras are used. The same principals disclosed herein may be extended to N cameras in other embodiments, where N may be greater or less than four.

Camera calibration mapping data 818 may be generated by the calibration procedure in combination with the world to view meshes and stored in a 3d bowl mesh table 820. As described above in more detail, the world view meshes 820 may be generated offline 822 and stored for later use by the calibrator module 824.

For each predefined virtual view point, calibrator module 824 reads the associated 3D bowl mesh table 820, accounts for camera calibration parameters 818 and generates a 2D mesh lookup table for each of the four channels. This is typically a onetime operation and done when the system is started, such as when the system is placed in a vehicle during an assembly process, for example. This process may be repeated whenever a position change is sensed for one of the cameras mounted on the vehicle. Thus, the 3D bowl mesh table 820 may be generated for each frame for the temporal camera as the calibration of the temporal camera changes each frame as the vehicle moves. In some embodiments, the calibration process may be repeated each time a vehicle is started, for example.

In certain cases, captured image data from a camera may not be valid for use in conjunction with a temporal buffer. For example, where a vehicle, such as a car, is travelling in congested traffic, the captured images from the camera may include images of other vehicles. Such images would be inappropriate, as an example, for use with a temporal camera displaying images of a region underneath the vehicle. In such cases, the temporal camera may be disabled, for example, by making a model of the vehicle opaque when the captured images include objects that render their use for the temporal camera invalid. Transparency of the model may be increased to make the model less opaque once images are capture and stored in the temporal buffer which do not include such objects. Objects in the captured images may be detected and identified using any known technique.

Figure 9:
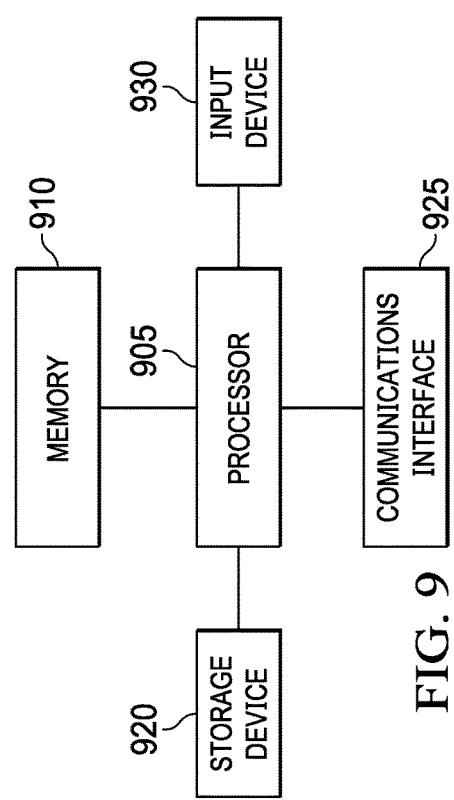
FIG. 9 is a block diagram of an embodiment of a computing device, in accordance with aspects of the present disclosure.

As illustrated in FIG. 9, device 900 includes a processing element such as processor 905 that contains one or more hardware processors, where each hardware processor may have a single or multiple processor cores. Examples of processors include, but are not limited to, a central processing unit (CPU) or a microprocessor. Although not illustrated in FIG. 9, the processing elements that make up processor 905 may also include one or more other types of hardware processing components, such as graphics processing units (GPUs), application specific integrated circuits (ASICs), field-programmable gate arrays (FPGAs), and/or digital signal processors (DSPs). In certain cases, processor 905 may be configured to perform the tasks described in conjunction with modules 810-816, 824-830 of FIG. 8.

FIG. 9 illustrates that memory 910 may be operatively and communicatively coupled to processor 905. Memory 910 may be a non-transitory computer readable storage medium configured to store various types of data. For example, memory 910 may include one or more volatile devices such as random access memory (RAM). In certain cases, the temporal buffer 832 of FIG. 8 may be part of the memory 910. Non-volatile storage devices 920 can include one or more disk drives, optical drives, solid-state drives (SSDs), tap drives, flash memory, electrically programmable read only memory (EEPROM), and/or any other type memory designed to maintain data for a duration time after a power loss or shut down operation. The non-volatile storage devices 920 may also be used to store programs that are loaded into the RAM when such programs executed.

Persons of ordinary skill in the art are aware that software programs may be developed, encoded, and compiled in a variety of computing languages for a variety of software platforms and/or operating systems and subsequently loaded and executed by processor 905. In one embodiment, the compiling process of the software program may transform program code written in a programming language to another computer language such that the processor 905 is able to execute the programming code. For example, the compiling process of the software program may generate an executable program that provides encoded instructions (e.g., machine code instructions) for processor 905 to accomplish specific, non-generic, particular computing functions.

After the compiling process, the encoded instructions may then be loaded as computer executable instructions or process steps to processor 905 from storage 920, from memory 910, and/or embedded within processor 905 (e.g., via a cache or on-board ROM). Processor 905 may be configured to execute the stored instructions or process steps in order to perform instructions or process steps to transform the computing device into a non-generic, particular, specially programmed machine or apparatus. Stored data, e.g., data stored by a storage device 920, may be accessed by processor 905 during the execution of computer executable instructions or process steps to instruct one or more components within the computing device 900. Storage 920 may be partitioned or split into multiple sections that may be accessed by different software programs. For example, storage 920 may include a section designated for specific purposes, such as storing program instructions or data for updating software of the computing device 900. In one embodiment, the software to be updated includes the ROM, or firmware, of the computing device. In certain cases, the computing device 900 may include multiple operating systems. For example, the computing device 900 may include a general-purpose operating system which is utilized for normal operations. The computing device 900 may also include another operating system, such as a bootloader, for performing specific tasks, such as upgrading and recovering the general-purpose operating system, and allowing access to the computing device 900 at a level generally not available through the general-purpose operating system. Both the general-purpose operating system and another operating system may have access to the section of storage 920 designated for specific purposes.

The one or more communications interfaces may include a radio communications interface for interfacing with one or more radio communications devices. In certain cases, elements coupled to the processor may be included on hardware shared with the processor. For example, the communications interfaces 925, storage, 920, and memory 910 may be included, along with other elements such as the digital radio, in a single chip or package, such as in a system on a chip (SOC). Computing device may also include input and/or output devices, not shown, examples of which include sensors, cameras, human input devices, such as mouse, keyboard, touchscreen, monitors, display screen, tactile or motion generators, speakers, lights, etc. Processed input, for example from the radar device 930, may be output from the computing device 900 via the communications interfaces 925 to one or more other devices.

In this description, the term "couple" may cover connections, communications, or signal paths that enable a functional relationship consistent with this description. For example, if device A generates a signal to control device B to perform an action: (a) in a first example, device A is coupled to device B by direct connection; or (b) in a second example, device A is coupled to device B through intervening component C if intervening component C does not alter the functional relationship between device A and device B, such that device B is controlled by device A via the control signal generated by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

Modifications are possible in the described embodiments, and other embodiments are possible, within the scope of the claims.

What is claimed is:

1. A method, comprising:
    obtaining a first location of a vehicle, the vehicle having a set of cameras disposed about the vehicle;
    capturing, by the set of cameras, a set of images of a scene including a region while the vehicle is at the first location;
    storing images of the set of images of the scene in a memory, wherein the images are associated with a time the images were captured;
    determining that the vehicle has moved to a second location, the region being under the vehicle so as to become invisible to the set of cameras while the vehicle is at the second location;
    obtaining the second location of the vehicle;
    determining an amount of time for moving the vehicle from the first location to the second location;
    generating a set of motion data, the motion data indicating a relationship between the second location of the vehicle and the first location of the vehicle;
    determining one or more images of the stored images from the memory which correspond to the region under the vehicle at the second location based on the set of motion data;
    rendering a view of the region under the vehicle based on the one or more images corresponding to the region and the set of motion data; and
    outputting the rendered view.

2. The method of claim 1, further comprising:
    determining, based on the set of motion data, one or more cameras of the set of cameras which captured images of the second location; and
    wherein rendering the view is further based on the determined one or more cameras.

3. The method of claim 1, wherein images of the set of images are captured over a predetermined capture time period.

4. The method of claim 3, further comprising:
    removing older images, of the set of images, from the memory when the older images become older than the predetermined capture time period.

5. The method of claim 1, further comprising:
    generating an under-vehicle mesh based on the first location; and
    generating the set of motion data based on the under-vehicle mesh and the obtained second location.

6. The method of claim 5, wherein rendering the view under the vehicle comprises:
    determining camera weights for cameras, of the set of cameras, based on an angle associated with each respective camera and the set of motion data;
    determining a set of relevant cameras based on the determined camera weights; and
    blending one or more images of the stored images based on the determined camera weights.

7. The method of claim 1, wherein the set of motion data includes a translation vector and rotation matrix.

8. An electronic device, comprising:
    a memory; and
    one or more processors, wherein the one or more processors are configured to execute instructions causing the one or more processors to:
        obtain a first location of a vehicle, the vehicle having a set of cameras disposed about the vehicle;
        obtain, from the set of cameras, a set of images of a scene including a region while the vehicle is at the first location;
        store images of the set of images of the scene in the memory, wherein the images are associated with a time the images were captured;
        obtain a second location of the vehicle, wherein the vehicle has moved to the second location, and wherein the region is under the vehicle so as to become invisible to the set of cameras at the second location;
        determine an amount of time used to move the vehicle from the first location to the second location;
        generate a set of motion data, the motion data indicating a relationship between the second location of the vehicle and the first location of the vehicle;
        determine one or more images of the stored images from the memory which correspond to the region under the vehicle at the second location based on the determined amount of time;
        render a view of the region under the vehicle at the second location based on the one or more images corresponding to the region and the set of motion data; and
        output the rendered view.

9. The electronic device of claim 8, wherein at least one of the one or more processors of the electronic device comprises a graphics processing unit (GPU) and wherein rendering the view is performed by the GPU.

10. The electronic device of claim 8, wherein the instructions further cause the one or more processors to:
    determine, based on the set of motion data, one or more cameras of the set of cameras which captured images of the second location; and
    wherein rendering the view is further based on the determined one or more cameras.

11. The electronic device of claim 8, wherein images of the set of images are captured over a predetermined capture time period.

12. The electronic device of claim 11, wherein the instructions further cause the one or more processors to:
    remove older images, of the set of images, from the memory when the older images become older than the predetermined capture time period.

13. The electronic device of claim 8, wherein the instructions further cause the one or more processors to:
    generate an under-vehicle mesh based on the first location; and generate the set of motion data based on the under-vehicle mesh and the obtained second location.

14. The electronic device of claim 13, wherein the instructions further cause the one or more processors to render the view under the vehicle by:
  determining camera weights for cameras, of the set of cameras, based on an angle associated with each respective camera and the set of motion data;
  determining a set of relevant cameras based on the determined camera weights; and
  blending one or more images of the stored images based on the determined camera weights.

15. The electronic device of claim 8, wherein the set of motion data includes a translation vector and rotation matrix.

16. A non-transitory program storage device comprising instructions stored thereon to cause one or more processors to:
  receive sets of images captured by a set of cameras, wherein:
    the sets of images are associated with a vehicle; and
    each set of images is associated with a respective time;
  store the sets of images in a memory;
  receive a set of motion data associated with the vehicle;
  determine a region under the vehicle at a first point in time which is invisible to the set of cameras;
  determine a second point in time prior to the first point in time based on the set of motion data;
  determine a subset of the set of stored images associated with the second point in time which corresponds to the region under the vehicle at the first point in time;
  render a view of the region under the vehicle for the first point in time based on the subset of the set of images corresponding to the region and the set of motion data; and
  provide an image that includes the rendered view of the region.

17. The non-transitory program storage device of claim 16, wherein at least one of the one or more processors comprise graphics processing unit (GPU) and wherein rendering the view is performed by the GPU.

18. The non-transitory program storage device of claim 16, wherein the instructions further cause the one or more processors to:
  determine, based on the set of motion data, one or more cameras of the set of cameras which captured images at the second point in time; and
  wherein rendering the view is further based on the determined one or more cameras.

19. The non-transitory program storage device of claim 16, wherein the instructions further cause the one or more processors to:
  generate an under-vehicle mesh based on the second point in time.

20. The non-transitory program storage device of claim 19, wherein the instructions further cause the one or more processors to render the view under the vehicle by:
  determining camera weights for cameras, of the set of cameras, based on an angle associated with each respective camera and the set of motion data;
  determining a set of relevant cameras based on the determined camera weights; and
  blending one or more images of the stored images based on the determined camera weights.

* * * * *